United States Patent [19]

Wilhelmy

[11] Patent Number: 4,900,537
[45] Date of Patent: Feb. 13, 1990

[54] CONTROL OF FORM OF CRYSTAL PRECIPITATION OF ALUMINUM HYDROXIDE USING COSOLVENTS AND VARYING CAUSTIC CONCENTRATION

[75] Inventor: Richard B. Wilhelmy, Apollo, Pa.

[73] Assignee: Biotage, Inc., Cambridge, Mass.

[21] Appl. No.: 940,354

[22] Filed: Dec. 11, 1986

[51] Int. Cl.[4] ............ C01F 7/02; C01F 7/06; C01F 7/14

[52] U.S. Cl. .................. 423/629; 423/127; 423/630; 23/305 A

[58] Field of Search ............ 423/629, 630, 127; 23/305 A

[56] References Cited

U.S. PATENT DOCUMENTS

| | | | |
|---|---|---|---|
| 2,657,115 | 10/1953 | Ashley | 23/143 |
| 2,915,475 | 12/1959 | Bugosh | 252/313 |
| 3,411,877 | 11/1968 | Michel et al. | 23/143 |
| 3,511,606 | 5/1970 | Halff et al. | 23/184 |
| 3,545,923 | 12/1970 | Merger et al. | 423/127 |
| 3,853,789 | 12/1974 | Warthen et al. | 252/463 |
| 4,039,615 | 8/1977 | Mikami et al. | 423/128 |
| 4,049,773 | 9/1977 | Mejdell et al. | 423/127 |
| 4,157,382 | 6/1979 | Goodboy et al. | 423/628 |
| 4,234,559 | 11/1980 | Tschamper | 423/629 |
| 4,248,848 | 2/1981 | Murakami et al. | 423/474 |
| 4,305,913 | 12/1981 | Anjier | 423/123 |
| 4,311,486 | 1/1982 | Yamada et al. | 23/301 |
| 4,364,919 | 12/1982 | Yamada et al. | 423/629 |
| 4,430,310 | 2/1984 | Malito et al. | 423/121 |
| 4,464,347 | 8/1984 | Bush | 423/112 |
| 4,496,524 | 1/1985 | Bush et al. | 423/122 |
| 4,500,444 | 2/1985 | Beekman | 252/315.7 |
| 4,511,542 | 4/1985 | Anjier et al. | 423/127 |

FOREIGN PATENT DOCUMENTS

1123184 8/1968 United Kingdom.

Primary Examiner—John S. Maples
Attorney, Agent, or Firm—Banner, Birch, McKie and Beckett

[57] ABSTRACT

A process is disclosed for the control of the particle form of aluminum hydroxide crystals precipitated from an alkali metal aluminate solution which comprises either the use of certain monohydric and polyhydric alcohols or controlling the caustic concentration of the sodium aluminate solution or a combination whereby particles shapes may be produced principally comprising acicular form or principally comprising lamellar form, depending upon the caustic concentration of the alkali metal hydroxide and the vol. % of the alcohol.

19 Claims, 6 Drawing Sheets

From Aluminate Solutions

FIG. 6

CONTROL OF FORM OF CRYSTAL PRECIPITATION OF ALUMINUM HYDROXIDE USING COSOLVENTS AND VARYING CAUSTIC CONCENTRATION

BACKGROUND OF THE INVENTION

1. Field of the Invention

This invention relates to the precipitation of aluminum hydroxide. More particularly, this invention relates to the control of the form of crystals obtained in the precipitation of aluminum hydroxide using either cosolvents or varying caustic concentration or both whereby crystals may be formed which vary from principally acicular to principally lamellar.

2 Description of the Related Art

The use of various process techniques to control the precipitate, e.g., the phase, obtained from a solution comprising sodium aluminate and an alkali hydroxide is well known. For example, Ashley U.S. Pat. No. 2,657,115 teaches the production of a semi-gelatinous aluminum hydroxide precipitate from an alkali metal aluminate solution formed by digesting an aluminum oxide or hydroxide such as bauxite either with sodium hydroxide or potassium hydroxide. The alkali metal aluminate solution is then reacted with a mineral acid to produce a semi-gelatinous aluminum hydroxide while maintaining the pH between 5.8 and about 8.3, preferably between 6.0 and 7.5.

Michel et al U.S. Pat. No. 3,411,877 describes the formation of hydrargillite crystals by the initial precipitation of an alumina gel formed preferably by a process of continuous precipitation with vigorous agitation using a solution of sodium aluminate and the addition of acids for precipitation in an amount and at a rate to maintain the pH within the range of 8 to 9.

Warthen et al U.S. Pat. No. 3,853,789 discloses a process for preparing macroporous alumina extrudates by first obtaining a hydrous alumina gel precipitated from solution either by combining an alkali metal aluminate with an acid or an acid salt, or by precipitating an acid aluminate salt solution by the addition of an alkaline reagent. The precipitation is said to be conducted at a pH of between 6 and 11 and preferably between 7.5 and 8.5.

The use of alcohols to treat Bayer spent liquor solutions is also known. Bayer spent liquor comprises the liquor which remains after precipitation of aluminum hydroxide from a solution or green liquor formed by the "Bayer Process" which comprises the digestion of bauxite ore using a caustic liquor.

Bush U.S. Pat. No. 4,464,347 and Bush et al U.S. Pat. No. 4,496,524, both assigned to the assignee of this invention, describe a treatment with ethanol of a Bayer spent liquor, i.e., a sodium aluminate liquor from a Bayer digestion process after initial precipitation of aluminum hydroxide therefrom. In these patents, the spent liquor is purified using the ethanol either to promote a precipitation of sodium oxalate impurity (when the ethanol concentration is 50 wt.% or less of the amount of liquor) or to form a two-layer system. In the latter case, the ethanol and at least a portion of the caustic comprise one layer and the remainder of the spent liquor forms the other layer. By removing some of the caustic from the spent liquor, the alumina to caustic ratio in the remaining spent liquor is increased sufficiently to permit a further precipitation to remove further alumina values from the spent liquor. The remaining spent liquor is then further treated to remove other impurities Malito et al U.S. Pat. No. 4,430,310 describes a process for purifying Bayer process liquors by treating the liquors, after removal of substantially all of the alumina content, with an organic solvent of relatively low boiling point (such as methanol, propanol, butanol, or mixtures thereof) which causes the precipitation of inorganic carbonate and/or sulfate salt from the treated liquor.

Halff et al U.S. Pat. No. 3,511,606 describes a process for recovering sodium hydroxide from solutions or mixtures containing aluminate. The sodium hydroxide is separated from an aqueous mixture of sodium hydroxide and aluminate by adding ethanol to the mixture to form a light phase containing the ethanol with sodium hydroxide and a little aluminate with most of the aluminate in a heavy phase together with some sodium hydroxide and a little ethanol. The patentee also says that methanol may be added to the sodium hydroxide solution instead of ethanol, in which case, an aluminum hydroxide is formed which precipitates. The precipitated aluminum hydroxide and methanol are then separated from the solution to form a reuseable solution of sodium hydroxide.

The use of alcohols such as methanol and ethanol to accelerate the recovery of alumina from aluminate liquor is discussed in British Patent Specification 1,123,184. The patentees state that the addition of a liquid alcohol to the non-alcoholic liquor is thermodynamically a pronounced irreversible process involving a considerable entropy rise and hence loss of energy. The patentees, therefore, introduce the alcohol into the aluminate solution by passing aluminate liquor down an addition column while passing a vapor mixture containing alcohol and steam through the column countercurrent to the aluminate liquor.

SUMMARY OF THE INVENTION

Quite surprisingly, however, I have discovered that the habit or form of crystals formed during a precipitation of aluminum hydroxide from an alkali metal aluminate may be preselected and controlled both by varying the pH of the alkali metal aluminate and by the addition of certain monohydric and polyhydric alcohols to the alkali metal aluminate solution. The precipitation may be controlled to form crystals having a habit or form which varies from principally acicular to principally lamellar crystal forms.

It is, therefore, an object of this invention to provide a process for controlling the habit or form of aluminum hydroxide crystals formed during precipitation of aluminum hydroxide from a caustic solution containing alkali metal aluminate.

It is another object of this invention to provide a process for controlling the habit or form of aluminum hydroxide crystals formed during precipitation of aluminum hydroxide from a caustic solution containing alkali metal aluminate in the presence of certain monohydric and polyhydric alcohols.

It is yet another object of this invention to provide a process for controlling the habit or form of aluminum hydroxide crystals formed during precipitation of aluminum hydroxide from a caustic solution containing alkali metal aluminate by the use of certain monohydric and polyhydric alcohols as cosolvents.

It is a further object of this invention to provide a process for controlling the habit or form of aluminum hydroxide crystals formed during precipitation of aluminum hydroxide from a caustic solution containing alkali metal aluminate by varying the pH of the caustic solution.

It is yet a further object of this invention to provide a process for controlling the habit or form of aluminum hydroxide crystals formed during precipitation of aluminum hydroxide from a caustic solution containing alkali metal aluminate by the combination of varying the pH of the caustic solution in the presence of certain monohydric and polyhydric alcohols.

In accordance with the invention, a process is disclosed for the control of the particle form of aluminum hydroxide crystals precipitated from an alkali metal aluminate solution which comprises either the use of certain monohydric or polyhydric alcohols or controlling the caustic concentration of the sodium aluminate solution or a combination whereby particles' shapes may be produced principally comprising acicular form or principally comprising lamellar form depending upon the caustic concentration and the volume percent of the alcohol present in the solution prior to precipitation.

DETAILED DESCRIPTION OF THE INVENTION

The terms "particle morphology" and "habit" are synonymous with the shape or form of a crystal, e.g., lamellar, tabular, equant, columnar, or acicular, as opposed to the crystal structure or system, e.g., tetragonal, orthorhombic, monoclinic, etc. While the crystal structure determines the number and types of crystalline faces, the morphology or habit is determined by the relative growth rates of the crystalline faces, with the fastest growing faces "disappearing" leaving the slower growing faces to define the final shape.

Figure 1:
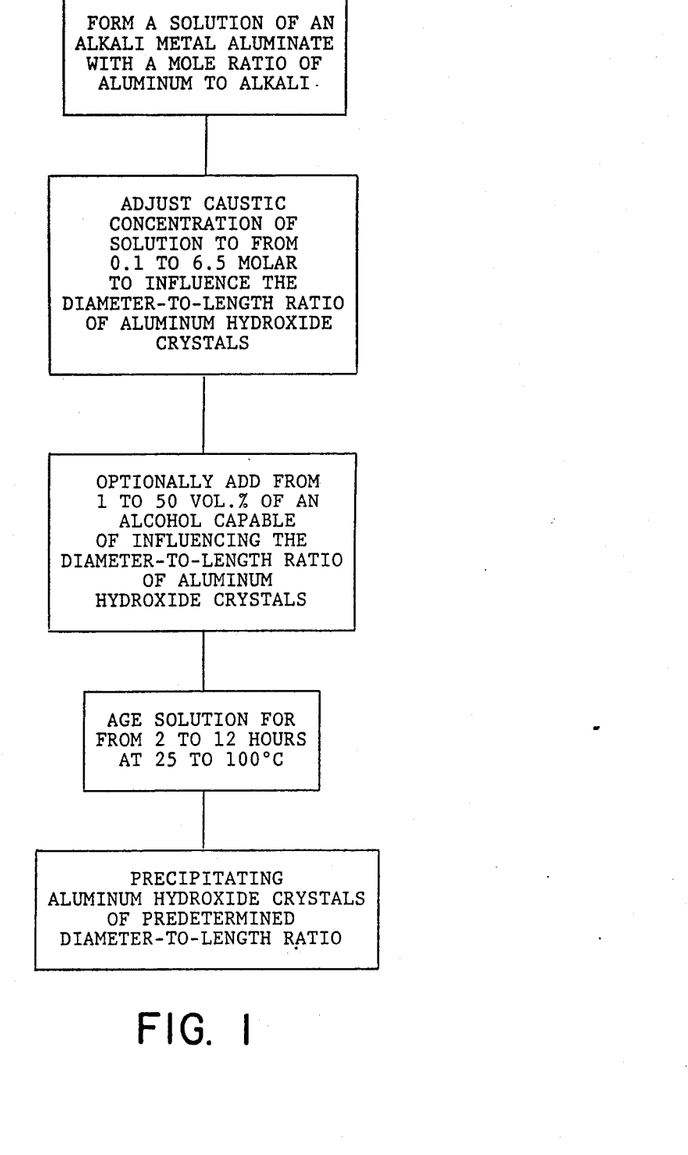
FIG. 1 is a flow sheet illustrating the process of the invention.
Figure 2:
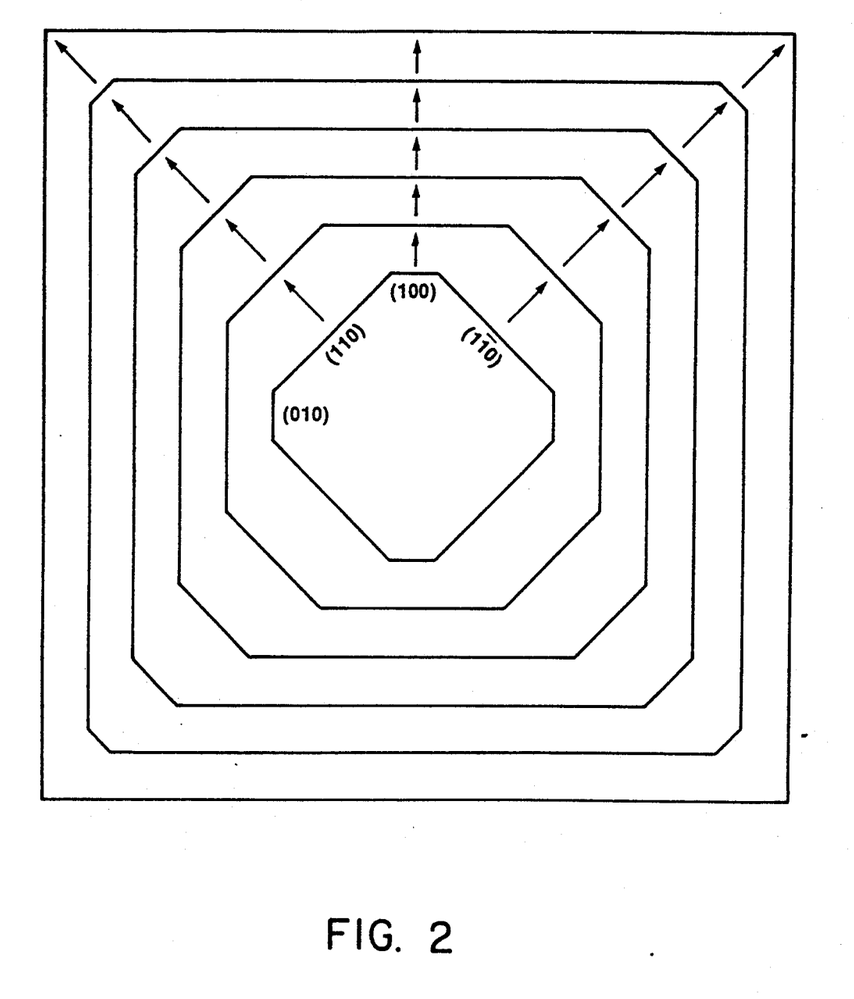
FIG. 2 is an illustration of a two dimension crystal showing the effect of slower growing planes on the eventual habit or morphology of the crystal.

This effect is shown in FIG. 2 with a two-dimensional crystal where the (110) and (110) planes grow faster than the (100) and (010) planes. As seen in the outer edges of the illustrated crystal, the slower growing (100) and (010) planes then eventually define the habit or morphology of the crystal.

This invention comprises a process to control the morphology or habit of aluminum hydroxide crystals to permit the respective production of crystals which are principally lamellar (flat platelets) or principally acicular (needle-like) as well as intermediate forms.

The term "aluminum hydroxide", as used herein, is intended to include mono- and tri-hydroxide forms as well as partially or completely dehydrated forms, including aluminum oxide.

The aluminum hydroxide crystals may be precipitated from a caustic solution of alkali metal aluminate dissolved in an alkali metal hydroxide or the solution may be a so-called "Bayer liquor" produced in the caustic digest of an alumina-bearing ore such as bauxite by a caustic solution containing an alkali metal hydroxide in what is known as the "Bayer Process".

The alkali metal hydroxide preferably comprises sodium hydroxide from a standpoint of economics. Other alkali metal hydroxides such as potassium hydroxide or lithium hydroxide may be substituted, however. When potassium hydroxide is substituted for sodium hydroxide, with all other conditions remaining the same, aluminum hydroxide crystals precipitated from potassium aluminate solutions tend to be more acicular in habit than corresponding crystals precipitated from sodium aluminate solutions. The mole ratio of the aluminum to alkali metal hydroxide (expressed as a $[Al^{3+}]$:[MOH] ratio where M is a monovalent alkali metal ion) preferably is between 0.5 to 0.8, and more preferably between 0.6 and 0.7.

The caustic alkali metal aluminate solution is preferably aged for crystal nucleation and growth for a period of from 2 to 12 hours. During aging, the solution may be agitated every 30 minutes or so by stirring or inverting samples in order to prevent caking of sediment, but stirring should be controlled since it can have an effect on morphology.

The solution may be maintained during aging at a temperature of from about 25° to 100° C. or higher, depending upon the desired phase. The morphology or habit of the crystals eventually precipitated from the solution is not dependent upon the aging temperature. However, the phase of the aluminum hydroxide crystals is temperature dependent. Bayerite crystals, for example, form from solutions aged at 25° C. while gibbsite forms at temperatures between 50° to 100° C.

In accordance with one aspect of the invention, the habit of the crystals expressed as the axial ratio of diameter to length is dependent upon the concentration of the alkali metal hydroxide. This relationship may be expressed as: $Log_{10}(Diameter/Length) = a[MOH] - b$, where M = the alkali metal and [MOH] is in moles/dm$^3$. When MOH is sodium hydroxide, a = 0.28 and b = 0.69.

Figure 3:
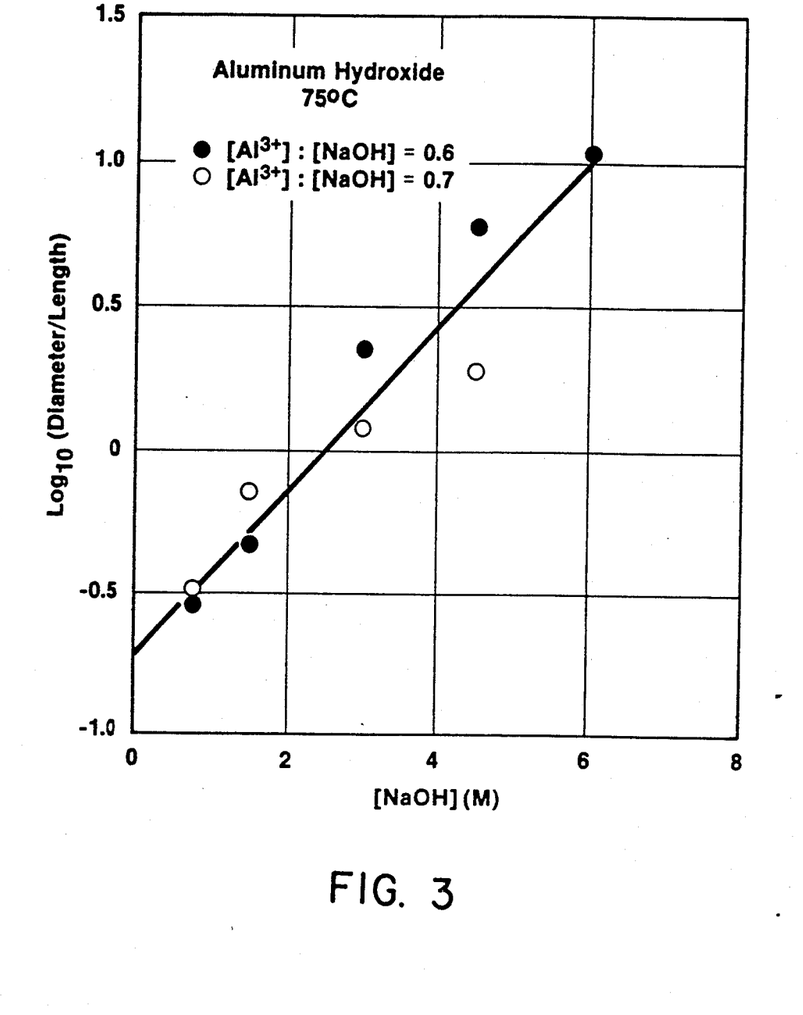
FIG. 3 is a graph showing the effect of sodium hydroxide concentration on the particle diameter to length ratio of sodium aluminate solutions aged at 75° C.

This relationship of caustic concentration to crystal morphology or habit is illustrated in FIG. 3 wherein it can be seen that the crystals become more lamellar in shape as the caustic concentration increases. In this formula, as illustrated in FIG. 3, equant crystals, i.e., crystals having diameter/length ratios of unity, are obtained when the molarity of NaOH, for example, is about 2.5 M.

In accordance with a preferred embodiment of the invention, the habit of the crystals is further controlled by the use of certain monohydric and polyhydric alcohols in the solution. Monohydric and polyhydric alcohols which may be used in the process of the invention are defined to include any alcohol, including diols and triols which: (a) will not inhibit the precipitation of the aluminum hydroxide from an alkali metal aluminate solution; and (b) which will vary the habit or form of the precipitated aluminum hydroxide crystal by change in the concentration of the alcohol. The use of methanol or diethylene glycol has been found to not only affect the habit of the crystals but as well to increase the precipitation rate of aluminum hydroxide crystals from the resulting solution when the particular alcohol is present. Conversely, the use of ethanol or acetone has been found to inhibit or suppress the precipitation of aluminum hydroxide crystals.

The amount of monohydric or polyhydric alcohol which may be added to the solution may range from 0 to 50 vol.%, preferably up to about 25 vol.%, and most preferably from above 2 vol.% to up to 20 vol.%. Upon the addition of greater than 2 vol.% methanol to the solution, instantaneous precipitation was noted to occur. Preferably, all the solutions are supersaturated so that spontaneous nucleation and crystal growth will occur. It will be understood that seed crystals may be added to initiate precipitation and acicular or lamellar form would be obtained depending on the conditions. The monohydric or polyhydric alcohol is, therefore, preferably added to the solution after the aging period, preferably just before precipitation.

The effect, for example, of the presence of methanol on the crystal habit of the resultant precipitate can be expressed from sodium aluminate solutions in the following modification of the previous formula:

$$\text{Log}_{10}(\text{Axial Ratio}) = 0.28\,[\text{NaOH}] + 0.036\,[\text{methanol}] - 0.69$$

where:
Axial Ratio = Diameter/Length of crystal
[NaOH] is in moles/dm$^3$

It will be appreciated that similar results can be obtained for other metal hydroxides, e.g., KOH or LiOH.

Figure 4:
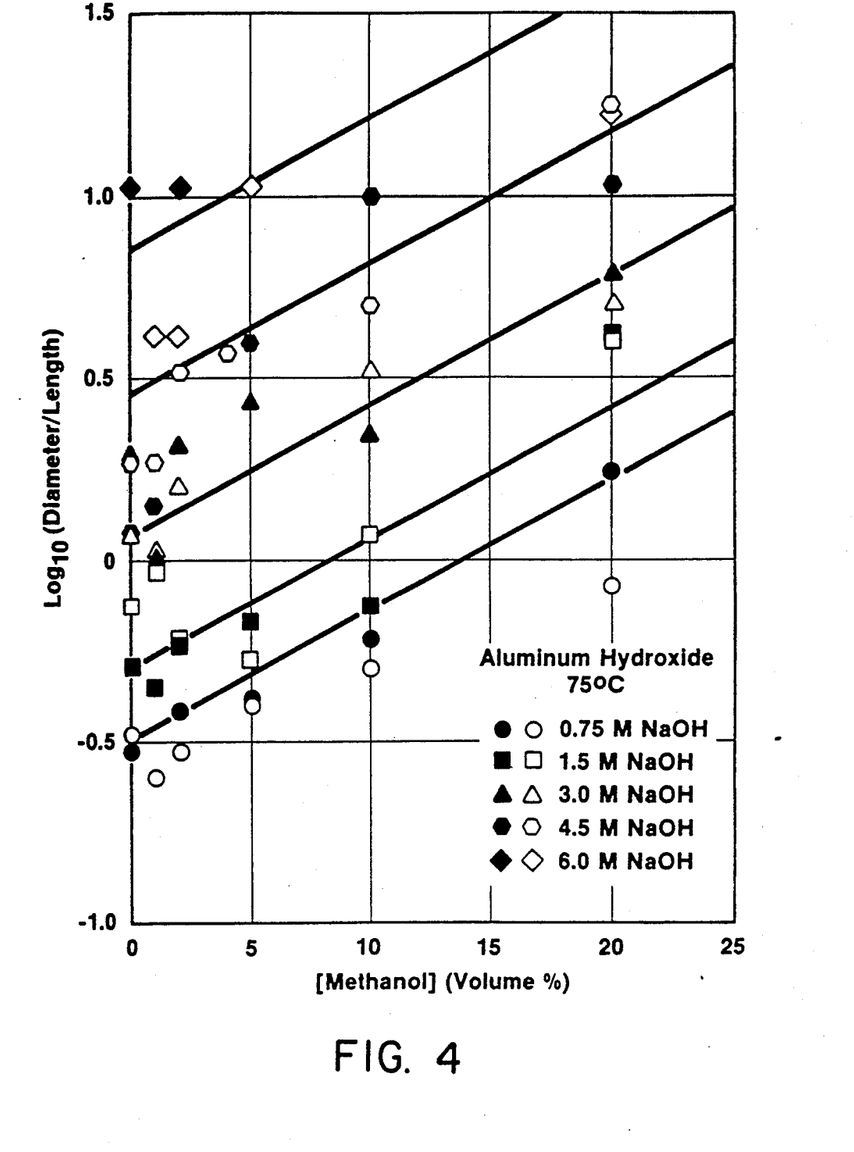
FIG. 4 is a graph of particle diameter to length ratio of sodium aluminate solutions aged at 75° C. at several sodium hydroxide concentrations as a function of methanol concentration.
Figure 5:
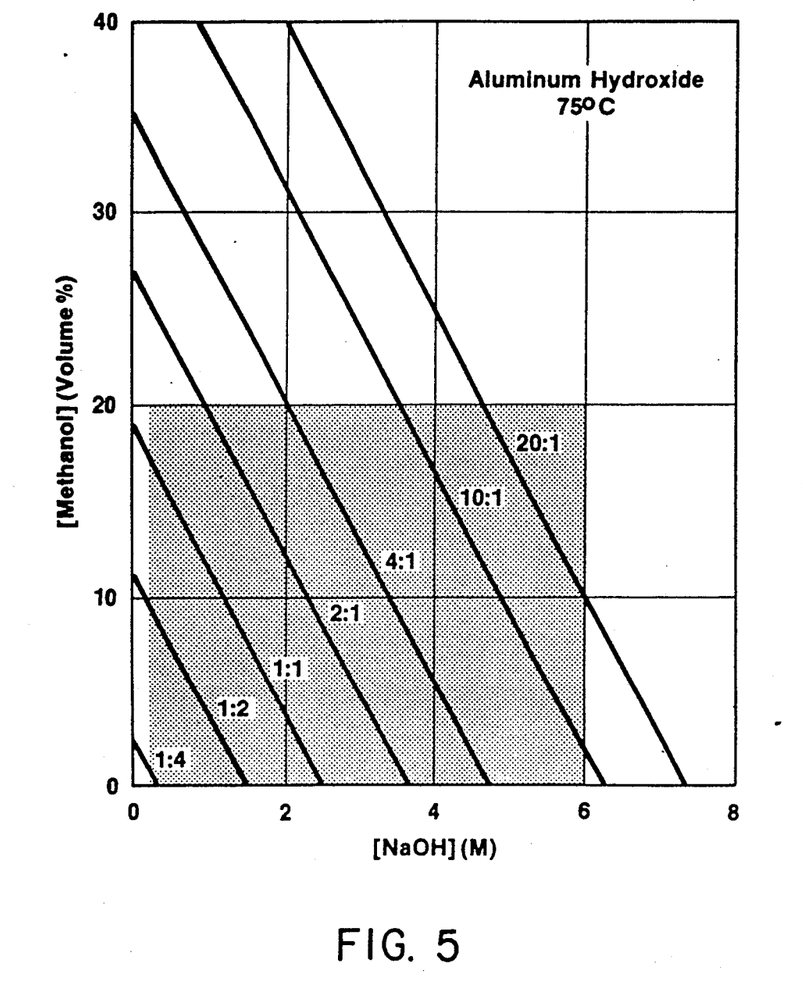
FIG. 5 is a plot showing the predicted isomorphs as a function of sodium hydroxide and methanol concentrations.
Figure 6:
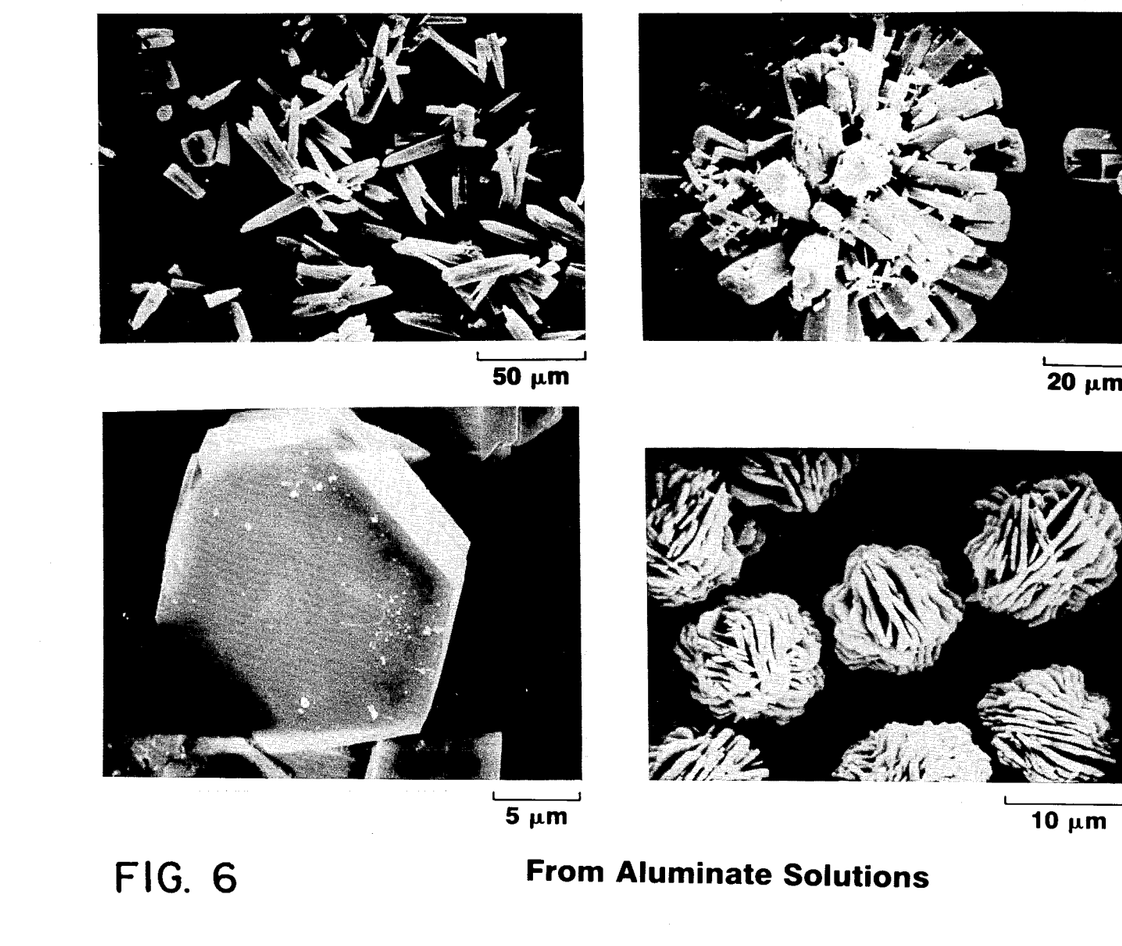
FIG. 6 is a series of scanning electron micrographs representing some of the various morphologies of aluminum hydroxides that have been generated.

This relationship is illustrated in both FIGS. 4 and 5 wherein it can be seen that as the volume percent of methanol was increased and/or the concentration of sodium hydroxide was increased, the resulting crystals became more lamellar in habit while a reduction in methanol volume or sodium hydroxide concentration resulted in crystals more acicular in habit or form.

The following examples will serve to further illustrate the invention.

EXAMPLE 1

To illustrate the effect of NaOH concentration alone on the habit or form of aluminum hydroxide crystals, a sodium aluminate solution was prepared using reagent grade sodium hydroxide pellets, 99.96% pure aluminum powder (Alcoa 7123 atomized powder) and freshly boiled distilled water. About 260 gm/l of sodium hydroxide pellets were added to a Teflon bottle twice the volume of the final solution. To this was slowly added water with stirring until the solution was approximately one-half the final volume (½ liters). The bottle was then immersed in cold water. 123 grams of the aluminum powder was then slowly added to the solution as a slurry. After the addition was completed, the suspension was placed in an oil bath and heated to boiling. The contents were boiled until the solution was clear. This resulting solution was cooled to room temperature and diluted to a volume of 1 liter. The solution was allowed to stand overnight and filtered the following day using a 0.45 micrometer Metricel DM membrane (Gelman Instrument Company).

The resulting solution having a [Al$^{3+}$]:[NaOH] ratio of 0.7 was divided into two portions One portion was diluted with an NaOH solution to form a final solution having a [Al$^{3+}$]:[NaOH] ratio of 0.6. The two solutions were aged for 3 and 9 hours, respectively. Aluminum hydroxide precipitated from each of the samples and the diameter-to-length ratio was determined as shown in the following table.

TABLE I

| Sample Number | Molarity of NaOH | Al$^{3+}$:NaOH Ratio | Diameter/Length of Crystals |
|---|---|---|---|
| 1 | 0.75 | 0.6 | 0.3 |
| 2 | 1.50 | 0.6 | 0.5 |
| 3 | 3.00 | 0.6 | 2.0 |
| 4 | 4.50 | 0.6 | 1.6 |
| 5 | 6.00 | 0.6 | 11.0 |
| 6 | 0.75 | 0.7 | 0.3 |
| 7 | 1.50 | 0.7 | 0.7 |
| 8 | 3.00 | 0.7 | 1.2 |
| 9 | 4.50 | 0.7 | 1.9 |

The results indicate that for both 0.6 and 0.7 ratios, the crystals increase in their diameter/length ratios as the concentration of the sodium hydroxide increases, i.e., the crystals become more lamellar.

EXAMPLE 2

To illustrate the effect on the crystal habit of aluminum hydroxide when differing amounts of methanol were present at different molarities of NaOH, a basic sodium aluminate solution similar to that described in Example 1 was similarly prepared and aged (75° C. for 9 hours for 0.6 ratio solution and 75° C. for 3 hours for 0.7 ratio solution) and then appropriately diluted. Aluminum hydroxide crystals were then precipitated from each solution, and the crystal habit of each was measured and tabulated in Tables II and III below.

TABLE II

| Sample Number | Molarity of NaOH | Volume % Methanol | Al$^{3+}$:NaOH Ratio | Diameter/Length of Crystals |
|---|---|---|---|---|
| 10 | 0.75 | 1 | 0.6 | 0.1 |
| 11 | 0.75 | 2 | 0.6 | 0.4 |
| 12 | 0.75 | 5 | 0.6 | 0.4 |
| 13 | 0.75 | 10 | 0.6 | 0.6 |
| 14 | 0.75 | 20 | 0.6 | 1.7 |
| 15 | 1.50 | 1 | 0.6 | 0.4 |
| 16 | 1.50 | 2 | 0.6 | 0.6 |
| 17 | 1.50 | 5 | 0.6 | 0.6 |
| 19 | 1.50 | 10 | 0.6 | 0.7 |
| 20 | 1.50 | 20 | 0.6 | 4.2 |
| 21 | 3.00 | 1 | 0.6 | 1.0 |
| 22 | 3.00 | 2 | 0.6 | 2.0 |
| 23 | 3.00 | 5 | 0.6 | 4.0 |
| 24 | 3.00 | 10 | 0.6 | 2.2 |
| 25 | 3.00 | 20 | 0.6 | 6.0 |
| 26 | 4.50 | 1 | 0.6 | 1.4 |
| 27 | 4.50 | 2 | 0.6 | 1.8 |
| 28 | 4.50 | 5 | 0.6 | 12.0 |
| 29 | 4.50 | 10 | 0.6 | 10.0 |
| 30 | 4.50 | 20 | 0.6 | 11.0 |
| 32 | 6.00 | 2 | 0.6 | 11.0 |

TABLE III

| Sample Number | Molarity of NaOH | Volume % Methanol | Al$^{3+}$:NaOH Ratio | Diameter/Length of Crystals |
|---|---|---|---|---|
| 35 | 0.75 | 1 | 0.7 | 0.3 |
| 36 | 0.75 | 2 | 0.7 | 0.3 |
| 37 | 0.75 | 5 | 0.7 | 0.4 |
| 38 | 0.75 | 10 | 0.7 | 0.5 |
| 39 | 0.75 | 20 | 0.7 | 0.8 |
| 40 | 1.50 | 1 | 0.7 | 0.9 |
| 41 | 1.50 | 2 | 0.7 | 0.6 |
| 43 | 1.50 | 5 | 0.7 | 0.5 |
| 44 | 1.50 | 10 | 0.7 | 1.2 |
| 45 | 3.00 | 20 | 0.7 | 4.0 |
| 46 | 3.00 | 1 | 0.7 | 0.9 |
| 47 | 3.00 | 2 | 0.7 | 1.6 |

TABLE III-continued

| Sample Number | Molarity of NaOH | Volume % Methanol | Al$^{3+}$:NaOH Ratio | Diameter/Length of Crystals |
|---|---|---|---|---|
| 49 | 3.00 | 10 | 0.7 | 3.3 |
| 50 | 3.00 | 20 | 0.7 | 5.0 |
| 51 | 4.50 | 1 | 0.7 | 1.8 |
| 52 | 4.50 | 2 | 0.7 | 3.3 |
| 54 | 4.50 | 5 | 0.7 | 3.7 |
| 55 | 4.50 | 10 | 0.7 | 5.0 |
| 56 | 4.50 | 20 | 0.7 | 20.0 |
| 57 | 6.00 | 1 | 0.7 | 4.2 |
| 58 | 6.00 | 2 | 0.7 | 4.2 |
| 59 | 6.00 | 5 | 0.7 | 11.0 |
| 60 | 6.00 | 20 | 0.7 | 18.0 |

EXAMPLE 3

To illustrate the effect of the use of a monohydric or polyhydric alcohol, as well as dimethyl ketone (acetone) on the yield of aluminum hydroxide crystals, a solution having a concentration of 2.1 M Al$^{3+}$ and 3.2 M NaOH was aged at 75° C. for 24 hours with stirring followed by the addition of either water or a mixture of water and 50 vol.% respectively of methanol, diethylene glycol, ethanol or acetone. The results are listed in Table IV as follows:

TABLE IV

| Solvent(s) | Mass of Precipitate (grams/cubic decimeter) |
|---|---|
| H$_2$O | 72 |
| H$_2$O + 50 vol. % Methanol | 123 |
| H$_2$O + 50 vol. % Diethylene Glycol | 122 |
| H$_2$O + 50 vol. % Ethanol | 5 |
| H$_2$O + 50 vol. % Acetone | 0 |

It will be noted from Table IV that the use of methanol or diethylene glycol almost doubled the yield of aluminum hydroxide crystals while the use of either ethanol or acetone effectively suppressed the precipitation. This latter effect could be useful in the preparation of supersaturated solutions of alkali metal aluminate from which either the ethanol or acetone was later evaporated.

Thus, the invention provides a novel process for controlling the habit or shape of aluminum hydroxide crystals by varying the caustic concentration of the solution or by varying the amount of an additional monohydric or polyhydric alcohol added to the alkali metal aluminate solution.

Having thus described the invention, what is claimed is:

1. A process for the control of the crystal form of aluminum hydroxide crystals precipitated from a solution of alkali metal aluminate dissolved in an alkali metal hydroxide which comprises controlling the alkali metal hydroxide concentration of the alkali metal aluminate solution by preselecting an alkali metal hydroxide concentration in a range of from 0.1 to 6.5 molar, whereby crystal forms can be produced which range from principally comprising acicular to principally comprising lamellar form, depending upon said alkali metal hydroxide concentration, said crystals becoming more lamellar in shape when the caustic concentration is increased.

2. The process of claim 1 wherein the step of controlling said caustic concentration further includes diluting a concentrated alkali metal aluminate solution to reduce the diameter-to-length ratio of the crystals.

3. The process of claim 1 wherein said precipitation is inhibited by the addition of about 50 vol.% of an inhibitor selected from the class consisting of ethanol and acetone.

4. The process of claim 1 wherein said step of controlling said caustic concentration of said alkali metal aluminate further includes adjusting the caustic concentration of said solution to provide a preselected diameter to length ratio of aluminum hydroxide crystals precipitated therefrom in accordance with the formula:

$$\text{Log}_{10} (\text{Diameter/Length}) = a [\text{MOH}] - b$$

wherein M = the alkali metal and [MOH] is the caustic concentration in moles/dm$^3$, and a = 0.28 and b = 0.69 when MOH is NaOH.

5. The process of claim 4 wherein said alkali metal is selected from the class consisting of lithium, sodium and potassium.

6. The process of claim 5 wherein said alkali metal is sodium.

7. The process of claim 5 wherein said alkali metal is potassium.

8. The process of claim 5 including the further step of adjusting the mole ratio of [Al$^{3+}$]: [alkali metal hydroxide] to from 0.5 to 0.8.

9. The process of claim 8 wherein said mole ratio is adjusted to from 0.6 to 0.7.

10. The process of claim 1 including the further step of controlling said crystal form by adding from 1 to 50 vol.% of an alcohol selected from the class consisting of mono, di and trihydric alcohols capable of influencing the crystal form of aluminum hydroxide crystals without adversely affecting the yield of said crystals.

11. The process of claim 10 wherein said step of controlling said crystal form of said aluminum hydroxide crystals by adding said alcohol further includes adjusting the amount of said alcohol in said solution to provide a preselected diameter-to-length ratio of aluminum hydroxide crystals precipitated therefrom in accordance with the formula:

$$\text{Log}_{10} (\text{Axial Ratio}) = 0.28 [\text{NaOH}] + 0.036 [\text{alcohol}] - 0.69$$

wherein the Axial Ratio is the Diameter/Length ratio of the aluminum hydroxide crystal, [NaOH] is the caustic concentration in moles/dm$^3$, and alcohol is the concentration of the alcohol in vol.%.

12. The process of claim 11 wherein said alcohol is selected from the class consisting of methanol and diethylene glycol.

13. The process of claim 12 including the further step of aging said solution at a temperature of at least 25° C. for a period of at least 2 hours prior to precipitating said aluminum hydroxide crystals.

14. A process for the control of the crystal form of aluminum hydroxide crystals precipitated from an alkali metal aluminate solution which comprises selecting an alkali metal selected from the class consisting of sodium and potassium as the alkali metal in said alkali metal aluminate solution whereby crystal forms can be produced which range from principally comprising acicular to principally comprising lamellar form, with aluminum hydroxide crystals precipitated from potassium aluminate solutions being more acicular in habit than corresponding aluminum hydroxide crystals precipitated from sodium aluminate solutions.

15. A process for control of the crystal form of aluminum hydroxide crystals precipitated from an alkali metal aluminate solution which comprises:
   (a) selecting an alkali metal selected from the class consisting of sodium and potassium as the alkali metal in said alkali metal aluminate solution to influence the crystal form of said aluminum hydroxide crystals; and
   (b) adding to said solution from 1 to 50 vol.% of an alcohol selected from the class consisting of mono, di, and trihydric alcohols capable of influencing the crystal form of said aluminum hydroxide crystals without adversely effecting the yield of said crystals;

whereby crystal forms can be produced which range from principally comprising acicular to principally comprising lamellar form, with aluminum hydroxide crystals precipitated from potassium aluminate solutions being more acicular in habit than corresponding aluminum hydroxide crystals precipitated from sodium aluminate solutions and the aluminum hydroxide crystals becoming more lamellar when the volume percent of the alcohol is increased in said alkali metal aluminate solution from which said crystals are precipitated.

16. A process for controlling the crystal form of an aluminum hydroxide crystal precipitated from an alkali metal aluminate solution which comprises:
   (a) forming an alkali metal aluminate solution by dissolving a sufficient amount of a source of aluminum in an alkali metal hydroxide selected from the class consisting of lithium hydroxide, sodium hydroxide, and potassium hydroxide to form an alkali metal aluminate solution having a ($Al^{3+}$):(alkali metal hydroxide) molar ratio of from 0.6 to 0.8;
   (b) adjusting the alkali metal hydroxide concentration of said solution prior to precipitation of said aluminum hydroxide crystals therefrom to achieve a preselected diameter to length ratio of said aluminum hydroxide crystal in accordance with the formula:

$$Log_{10} (Diameter/Length) = 0.28 (MOH) - 0.69$$

wherein M = the alkali metal and (MOH) is the alkali metal hydroxide concentration in moles/$dm^3$;
   (c) aging said solution at a temperature of from about 25 to 100° C. for from 2 to 12 hours; and
   (d) precipitating aluminum hydroxide crystals having said preselected diameter to length ratio.

17. The process of claim 16 including the further step of controlling said crystal form by adding from 1 to 50 vol.% of an alcohol selected from the class consisting of mono, di and trihydric alcohols capable of influencing the crystal form of aluminum hydroxide crystals without adversely affecting the yield of said crystals.

18. The process of claim 17 wherein said further step of adding said alcohol to said alkali metal aluminate solution to further control said crystal form of said aluminum hydroxide crystals comprising adding said alcohol in accordance with the following modification of said formula:

$$Log_{10} (Axial\ Ratio) = 0.28\ [NaOH] + 0.036\ [alcohol] - 0.69$$

wherein the Axial Ratio is the Diameter/Length ratio of the aluminum hydroxide crystal, and alcohol is the concentration of said added alcohol in vol.%.

19. A process for controlling the crystal form of an aluminum hydroxide crystal precipitated from an alkali metal aluminate solution which comprises:
   (a) forming an alkali metal aluminate solution by dissolving a sufficient amount of a source of aluminum in an alkali metal hydroxide selected from the class consisting of lithium hydroxide, sodium hydroxide, and potassium hydroxide to form an alkali metal aluminate solution having a ($Al^{3+}$):(alkali metal hydroxide) molar ratio of from 0.6 to 0.8;
   (b) adding to said solution from 1 to 50 vol.% of an alcohol selected from the class consisting of mono, di, and trihydric alcohols capable of influencing the crystal form of aluminum hydroxide crystals without adversely affecting the yield of said crystals;
   (c) adjusting the alkali metal hydroxide concentration of said solution and the amount of said alcohol in said solution prior to precipitation of said aluminum hydroxide crystals therefrom to achieve a preselected diameter to length ratio of said aluminum hydroxide crystals precipitated therefrom in accordance with the formula:

$$Log_{10} (Axial\ Ratio) = 0.28\ (MOH) + 0.036\ (alcohol) - 0.69$$

wherein the Axial Ratio is the Diameter/Length ratio of the aluminum hydroxide crystal, M = alkali metal, (MOH) is the alkali metal hydroxide concentration in moles/$dm^3$, and alcohol is the concentration of the alcohol in vol.%;
   (d) aging said solution at a temperature of from about 25° to 100° C. for from 2 to 12 hours; and
   (e) precipitating aluminum hydroxide crystals having said preselected diameter to length ratio.

* * * * *